(12) United States Patent
Cook

(10) Patent No.: US 9,736,227 B2
(45) Date of Patent: Aug. 15, 2017

(54) DATA CAPTURE ON A SERIAL DEVICE

(71) Applicant: Steve Cook, Irvine, CA (US)

(72) Inventor: Steve Cook, Irvine, CA (US)

(73) Assignee: Lantronix, Inc., Irvine, CA (US)

( * ) Notice: Subject to any disclaimer, the term of this patent is extended or adjusted under 35 U.S.C. 154(b) by 212 days.

(21) Appl. No.: 14/527,559

(22) Filed: Oct. 29, 2014

(65) Prior Publication Data

US 2015/0120820 A1    Apr. 30, 2015

Related U.S. Application Data

(60) Provisional application No. 61/897,169, filed on Oct. 29, 2013.

(51) Int. Cl.
*G06F 15/16* (2006.01)
*H04L 29/08* (2006.01)

(52) U.S. Cl.
CPC ............. *H04L 67/10* (2013.01); *H04L 67/34* (2013.01)

(58) Field of Classification Search
USPC .......................... 709/203, 201, 223, 224, 217
See application file for complete search history.

(56) References Cited

U.S. PATENT DOCUMENTS

| | | | |
|---|---|---|---|
| 5,812,879 A * | 9/1998 | Moro .................... | G06F 13/385 710/62 |
| 7,454,459 B1 * | 11/2008 | Kapoor ................. | G06Q 10/06 707/999.202 |
| 7,680,944 B1 | 3/2010 | Taghizadeh et al. | |
| 7,809,868 B1 | 10/2010 | Mu | |
| 9,398,529 B2 * | 7/2016 | Park .................. | H04W 52/0209 |
| 2003/0009710 A1 | 1/2003 | Grant | |
| 2006/0190238 A1 | 8/2006 | Autor et al. | |
| 2006/0252530 A1 * | 11/2006 | Oberberger ............. | G07F 17/32 463/29 |
| 2007/0081552 A1 * | 4/2007 | Brown ................ | H04L 41/0806 370/463 |
| 2008/0288618 A1 * | 11/2008 | Vardi .................. | H04L 67/2823 709/223 |
| 2008/0297244 A1 * | 12/2008 | Poulsen .................. | H03F 3/217 330/10 |
| 2012/0221736 A1 | 8/2012 | Endo et al. | |
| 2012/0290707 A1 | 11/2012 | Ennis et al. | |

(Continued)

*Primary Examiner* — Lan-Dai T Truong
(74) *Attorney, Agent, or Firm* — Rutan & Tucker LLP; Hani Z. Sayed

(57) ABSTRACT

A system and a method are provided for enabling a user to connect a serial port of a device server to a serial device, query and capture data and settings pertaining to the serial device such that the device server can communicate and exchange data with the serial device without requiring customized programming. The device server may periodically query and capture user-specified data from the serial device. A poll configuration feature may be used to specify one or more commands which the device server will periodically query from the serial device. The response to each poll may be further sliced into a multiplicity of smaller portions according to user-specified filter rules. The captured data may be presented to other users online by way of a Web Manager, and the device server may establish machine-to-machine communications by way of XML and a Command Line Interface.

12 Claims, 21 Drawing Sheets

(56) References Cited

U.S. PATENT DOCUMENTS

2013/0109375 A1\* 5/2013 Zeiler .................. H04W 4/028
   455/426.1
2013/0144605 A1\* 6/2013 Brager ................ G06F 17/3061
   704/9

\* cited by examiner

DATA CAPTURE ON A SERIAL DEVICE

CROSS-REFERENCE TO RELATED APPLICATIONS

This application claims the benefit of priority to U.S. Provisional Patent Application No. 61/897,169, filed Oct. 29, 2013, the entirety of which is hereby incorporated in its entirety.

BACKGROUND

The present invention generally relates to computer network systems; and more particularly, relates to establishing communication between a serial device and a device server.

Users of serial devices often have the need to remotely communicate with host computing systems (for example, a personal computer, a set top box, laptop computer, notebook computer or any other computing device, collectively referred to as a "PC" throughout this specification) to extend the distance between the devices and their hosts beyond that provided using, for example, an RS232 cable. The desired remote distance may span the length of an office building or even a continent.

Access to remote serial devices has been limited, since it was often necessary to physically connect a computer or PC to the serial device to download data from the serial device to the PC, or to provide for uploading data, operating parameters or software or firmware updates to the serial device from the PC. Fortunately, the advent of the Internet and network computing provided a method for providing remote communications. A demand arose to network enable older serial devices (may also be referred to as "legacy devices") by creating products that have a serial port and an Ethernet port, and which can accept data from legacy devices and send the data over a network and/or the Internet. Legacy devices may include a stand-alone vending machine, a microwave, a dishwasher or any other device that has a controller or processor, even if the controller or processor is limited in its computing capability. Alternatively, legacy devices can include devices that have significant computing capabilities, such as a FAX machine, a copier, a printer and the like.

Today, the creation of device server technology in embedded systems allows users to place legacy serial devices onto Ethernet networks, and thus, the Internet, with minimal effort and with limited knowledge of networking on the part of the user.

Many consumer applications and legacy serial devices are designed to communicate via a local serial communication port (a "COM" port) to a PC through a wired connection, and thus are network incompatible. Information flow between the serial device and the PC is typically accomplished using the RS232 standard communication scheme. Thus, the only way to make a legacy serial device network compatible in the past required each serial device to be connected to a PC wherein information was communicated through the network to the PC, which then communicated the information to the serial device.

It is clear that a more cost effective approach would be to connect a legacy serial device to a device server that would then provide network connectivity to the serial device. Once such device is the xPico® and xPico® WiFi® embedded device server manufactured and distributed by Lantronix, Inc.

One problem is that different types of serial devices require different settings and configurations, which requires a way for the device server to be programmed to communicate with the legacy serial device. Thus, upon initially connecting a device server to a legacy serial device and powering up, an initial state of the serial device is unknown, as well as the data configuration needed for communication between the device server and the legacy device.

Therefore, there is a need for a device server which is essentially "teachable" such that the device server can communicate and exchange data with a wide variety of different legacy devices without requiring custom programming.

SUMMARY OF THE INVENTION

In its most general aspects, the invention includes a system and a method for enabling a user to connect a serial port of a device server to a serial device, query and capture data and settings pertaining to the serial device such that the device server can communicate and exchange data with the serial device without requiring customized programming. The device server may periodically query and capture user-specified data from the serial device. A poll configuration feature may be used to specify one or more commands which the device server will periodically query from the serial device. The response to each poll may be further sliced into a multiplicity of smaller portions according to user-specified filter rules. The captured data may be displayed or transmitted to a user, or provided to another piece of equipment that receives the captured data for further processing.

In another aspect, the invention includes a system for collecting information from a serial device, comprising: a processor; a memory accessible by the processor; a serial port in communication with the processor for coupling the processor to a serial device; a network port in communication with processor for coupling the processor to a network; and a device server running on the processor, the device server having a data capture module configurable to capture data received by the device server from the serial device, the data capture module including a user interface allowing a user to manipulate inputs of the data capture model to configure the data capture model to communicate with the serial device and to extract selected data from the data received from the serial device. In another aspect, the user interface is presented to a user remote from the device server through the network.

In yet another aspect, the user interface provides for inputting parameters used by the data capture module of the device server to configure a polling message to be transmitted to a serial device coupled to the serial port, and also to configure a selected time during which the data capture module waits for a response to the transmitted polling message from the serial device. In one alternative aspect, the user interface provides a display of the response to the transmitted polling message received from the serial device.

In still another aspect, the user interface provides for inputting parameters used by the data capture module of the device server to filter a response from a serial device coupled to the serial port to a polling message transmitted from the data capture module to the serial device. In one alternative aspect, the inputted parameters comprise a rule, with the rules defining a filter having an input and an output. In another alternative aspect, the inputted parameters may comprise a plurality of rules, with each of the plurality of rules comprising a filter having an input and an output. In still another alternative aspect, the output of one of the filters feeds the input of another filter.

In yet another aspect, the user interface further provides for inputting at least one selector parameter that defines a selector, the selector used by the data capture module to identify specific data contained in the output of the filter. In an alternative aspect, the user interface further provides for selection of a display template for displaying the specific data to the user.

In another aspect, the invention includes a method of configuring a device server to communicate with and capture data from a serial device coupled to the device server, comprising: providing a user interface for configuring a device server to communicate with a serial device and to interpret information received from the serial device; inputting polling parameters using the user interface to formulate a polling message to be transmitted from the device server to the serial device; transmitting the polling message from the device server to the serial device; receiving a response to the polling message transmitted by the device server to the serial device from the serial device; defining at least one filter and applying the at least one filter to parse the response from the serial device; and defining at least one data selector and applying the at least one data selector to the parsed response from the serial device to select data to be transmitted to a user.

In one alternative aspect, formulating a polling message includes defining a listening interval during which a response to the polling message is expected. In still another alternative aspect, defining the at least one filter includes defining an input and an output for the at least one filter. A further alternative aspect includes defining a plurality of filters, each of the plurality of filters having an input and an output. In another alternative aspect, the output of at least one of the plurality of filters feeds the input of another one of the plurality of filters.

In a further aspect, the method includes displaying the selected data to the user.

In still another aspect, the user interface is provided by the device server to the user over a network. A further aspect includes displaying the selected data to the user over a network.

In still another aspect, the user interface provides for selecting a software program for use in displaying the selected data.

In one alternative aspect, the user interface is a graphical user interface. In another alternative aspect, the user interface is a command line interface. In still another alternative aspect, the user interface is an XML interface.

Other features and advantages of the present invention will become apparent from the following detailed description, taken in conjunction with the accompanying drawings, which illustrate, by way of example, the principles of the invention.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

Figure 2:
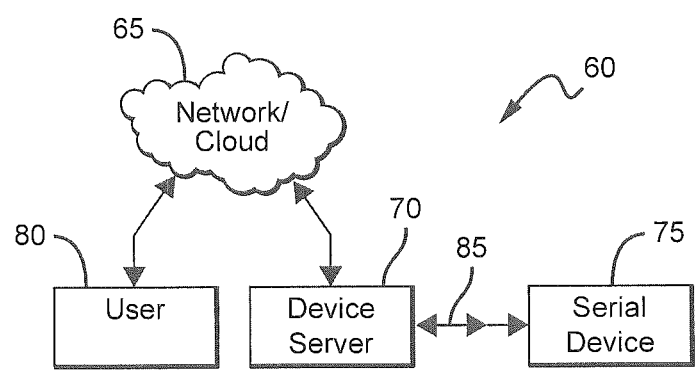
FIG. 2 is a graphical representation illustrating a network that provides access to the device server of FIG. 1 to allow a user to configure the device server to receive and report information and data received from the serial device.
Figure 3:
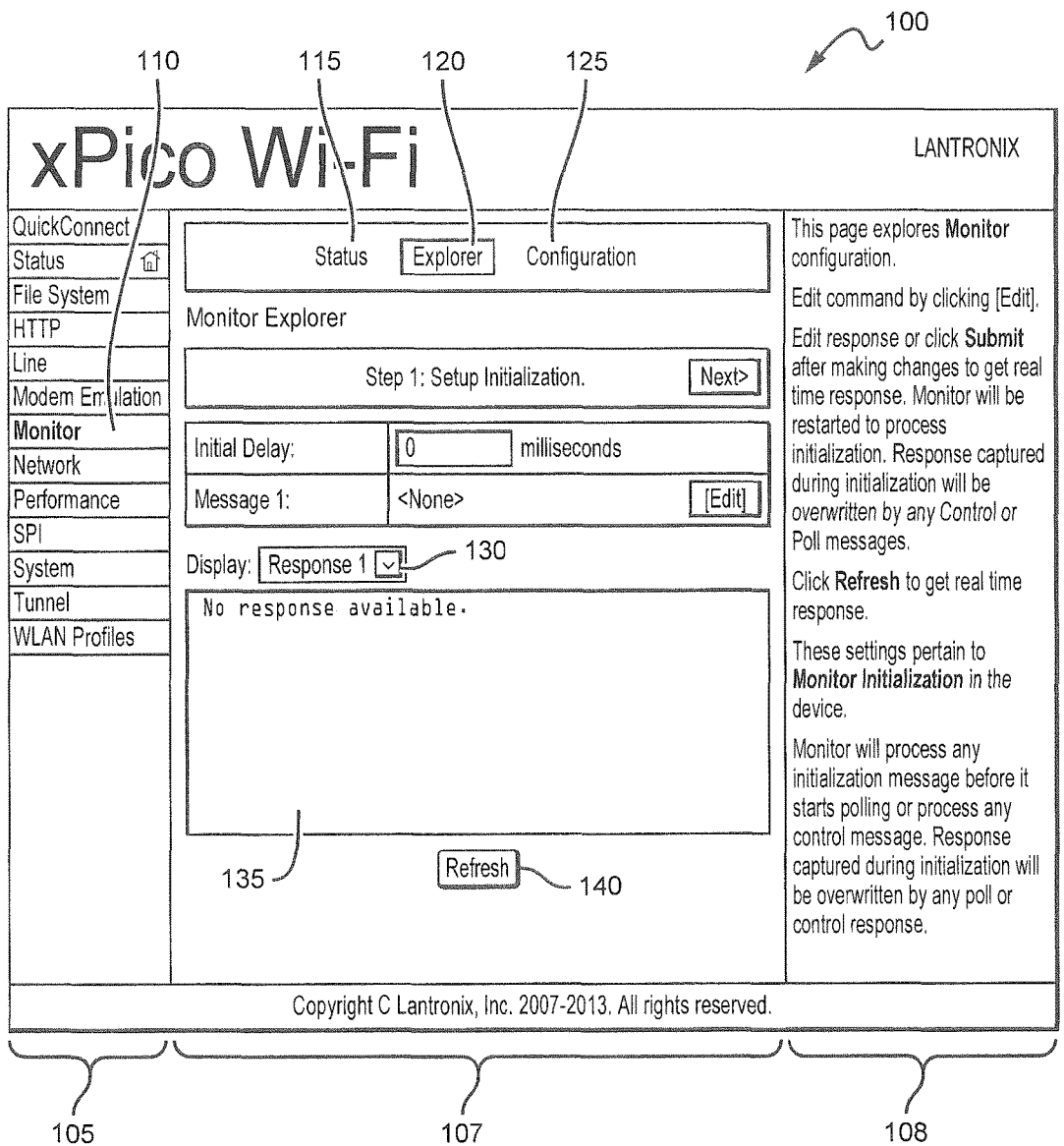
Figure 4:
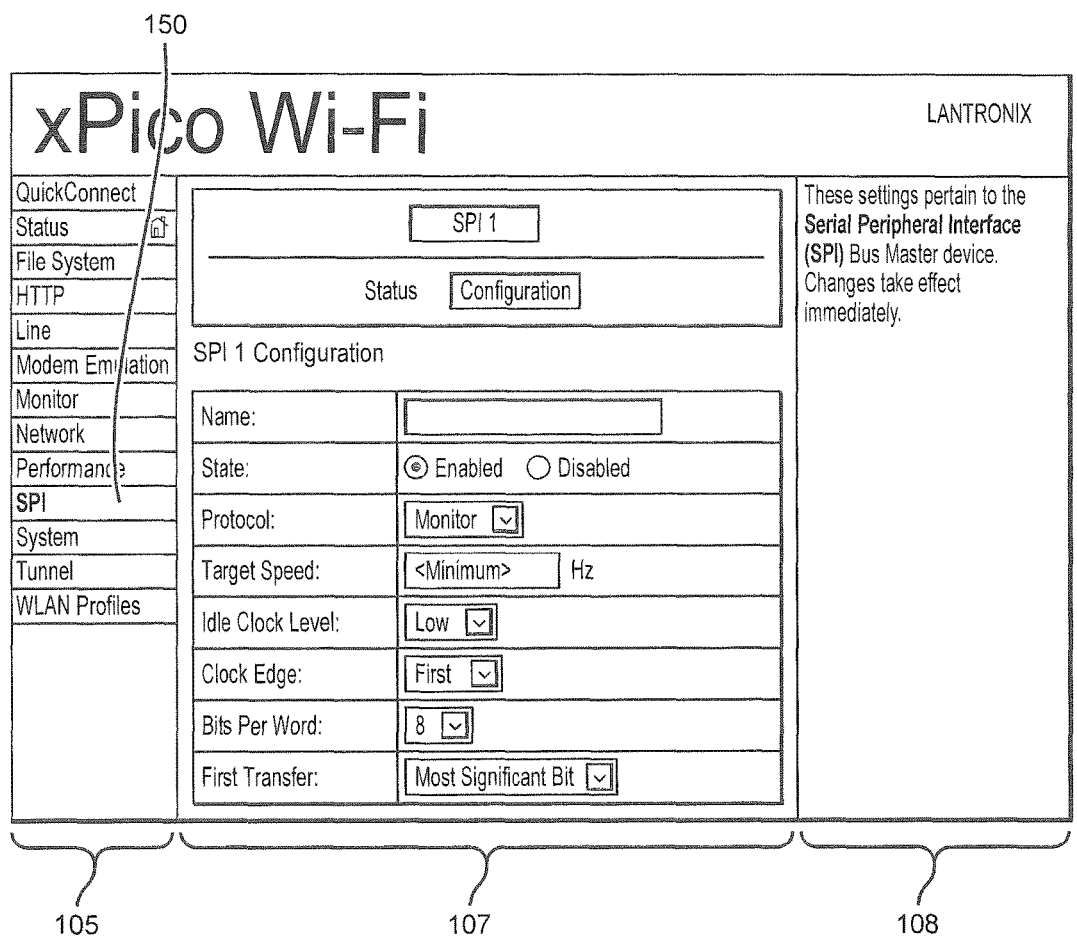
Figure 5:
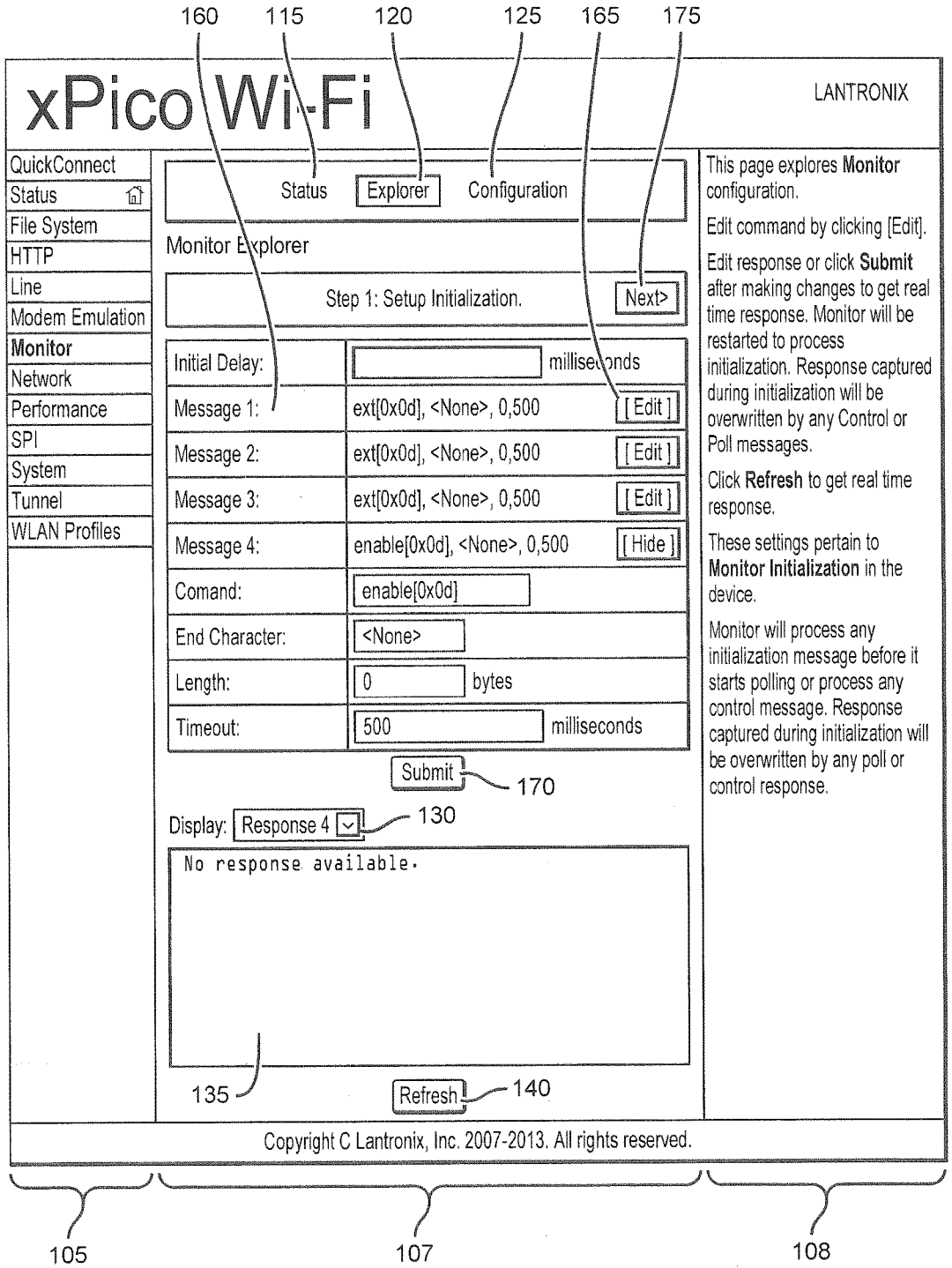
Figure 6:
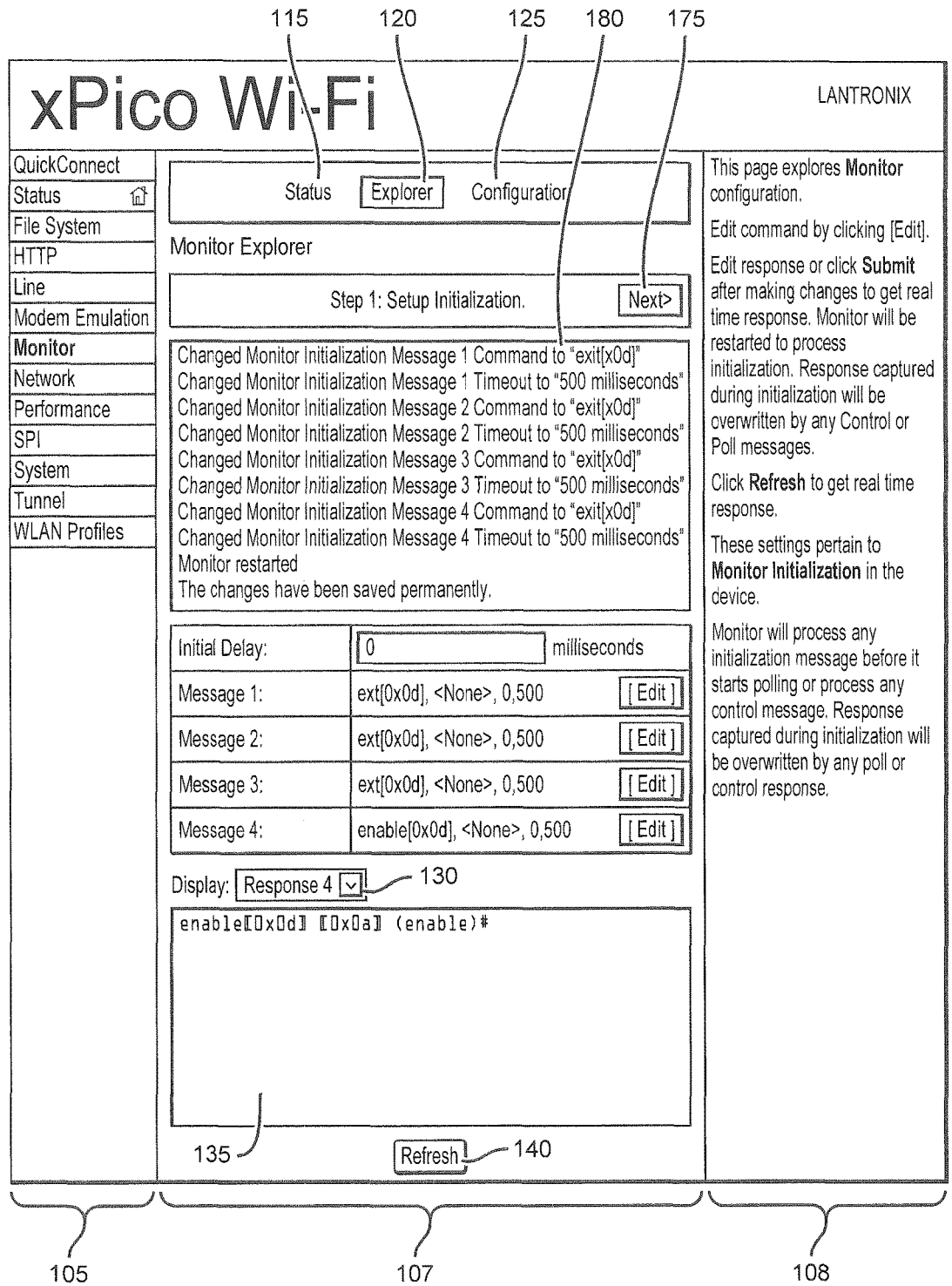
Figure 7:
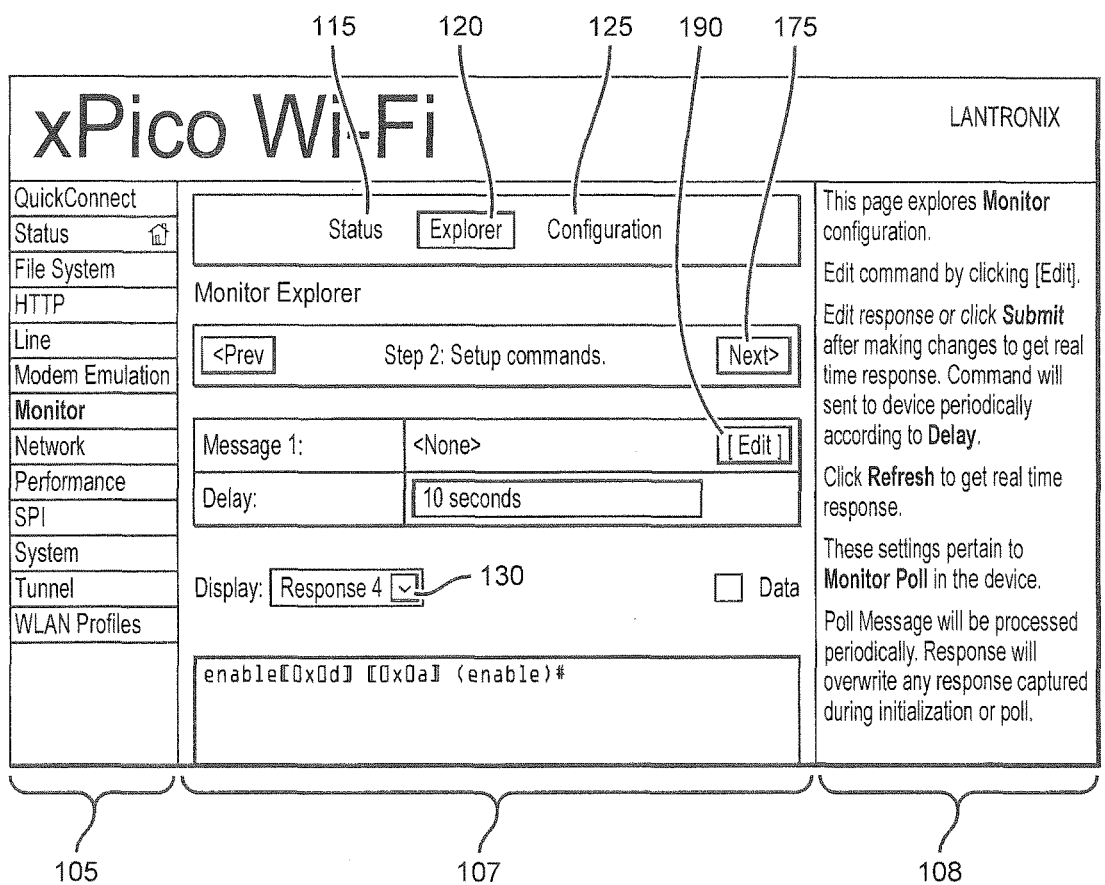
Figure 8:
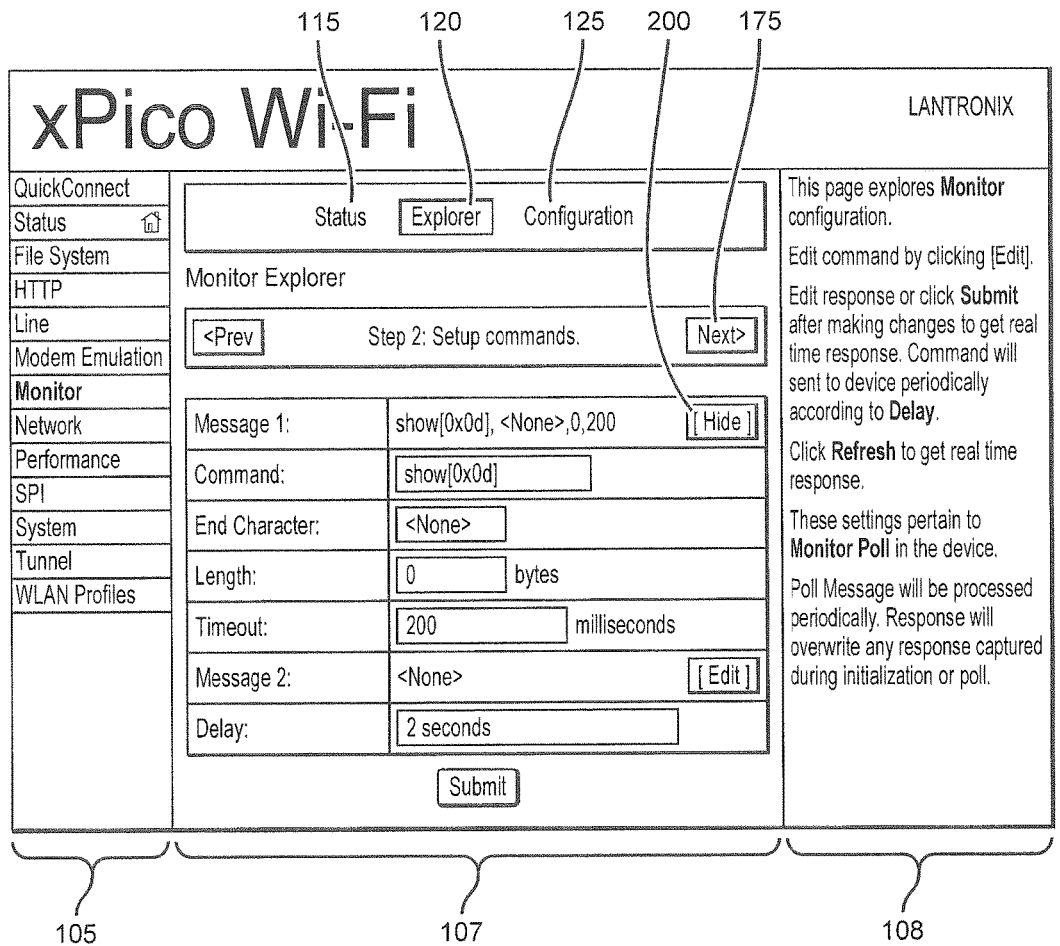
Figure 9:
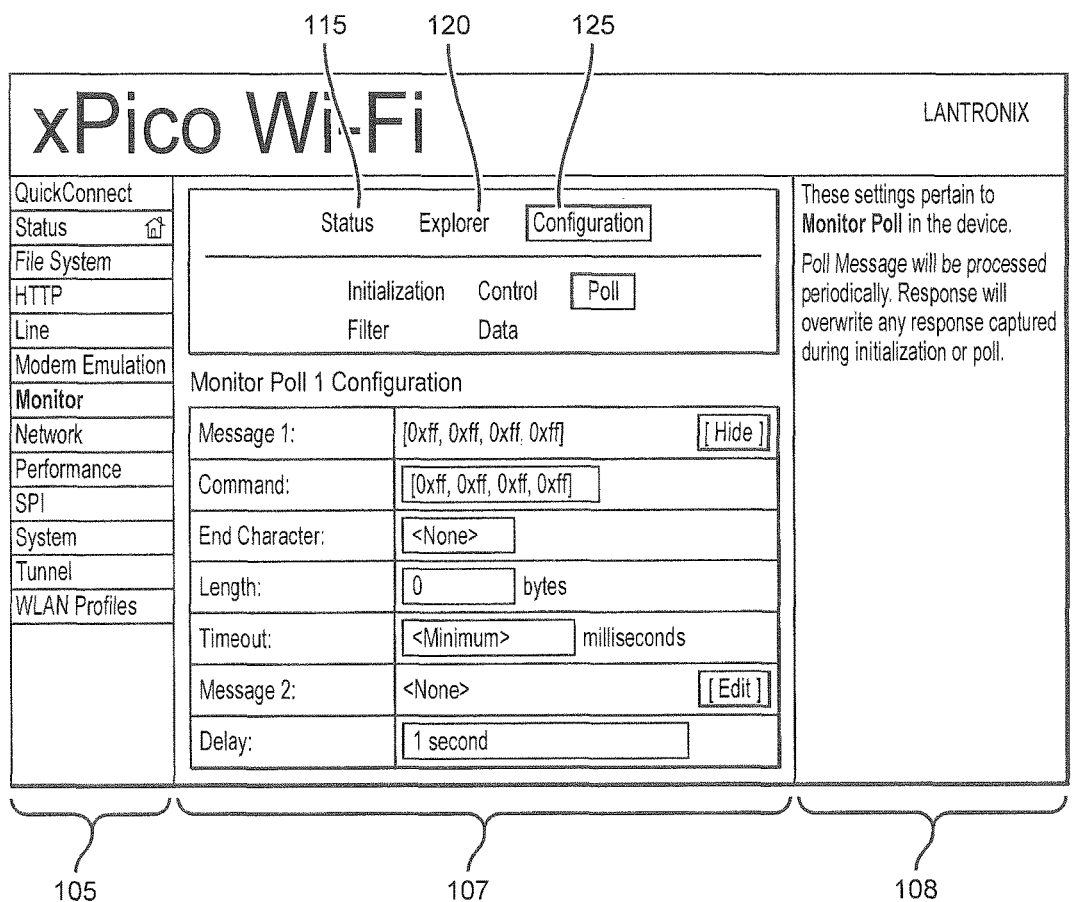

illustrates an initialization setup step performed within a Monitor Explorer, wherein an initial state of an external serial device is unknown;

FIG. 3 illustrates a setup initialization page of a Monitor Explorer program running on a processor of the device driver of FIG. 2;

FIG. 4 illustrates an initialization setup page of a Serial Peripheral Interface port to an external slave device according to some embodiments using a Monitor Configuration program running on the processor of device driver of FIG. 2;

FIG. 5 illustrates utilizing the Monitor Explorer to place a serial device into a known initial state, according to some embodiments;

FIG. 6 illustrates the Monitor Explorer displaying the results of changing the initialization parameters set using the screen of FIG. 5;

FIG. 7 illustrates an exemplary screen of the Monitor Explorer program used to input commands for controlling the polling of the serial device by the device driver of FIG. 2;

FIG. 8 illustrates an exemplary screen of the Monitor Explorer program depicting expanding the screen of FIG. 7 to allow modification of parameters of the polling configuration of the device driver of FIG. 2;

FIG. 9 illustrates an exemplary screen of the Monitor Configuration program that may be used to directly enter polling configuration parameters to configure the device driver.

Figure 10:
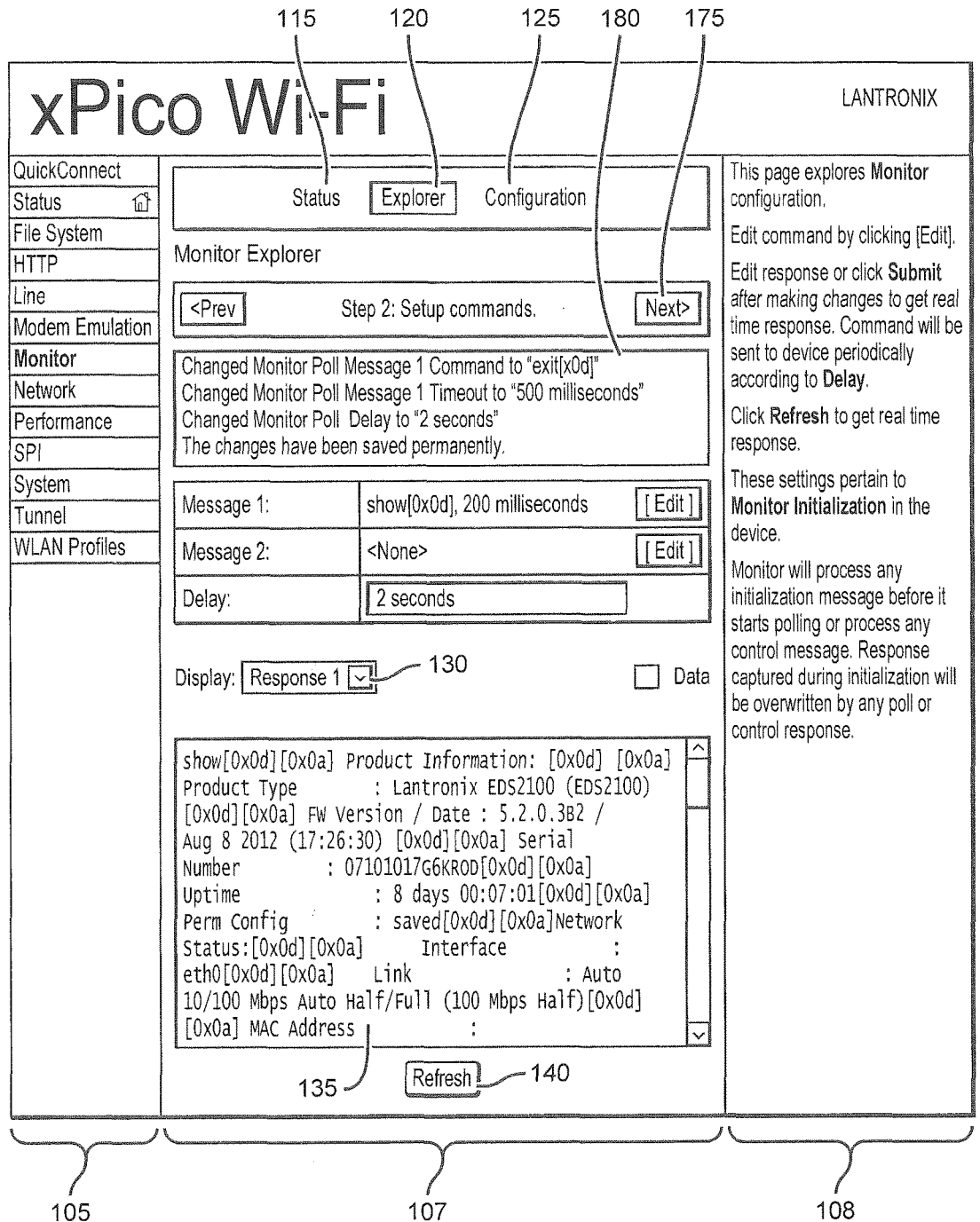

FIG. 10 illustrates an exemplary screen of the Monitor Explorer displaying the results of the parameter modification performed using the screens of FIGS. 8 and 9.

Figure 11:
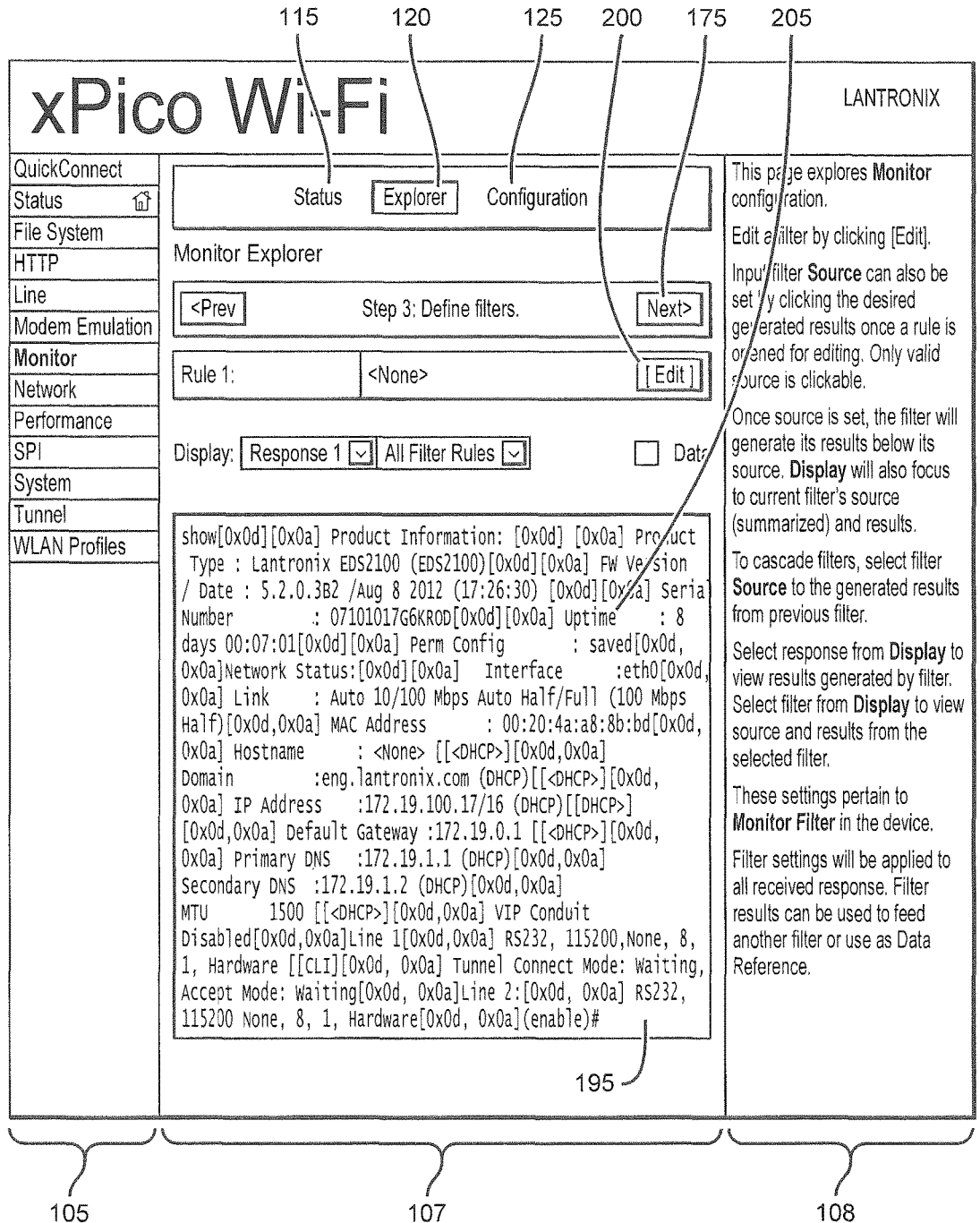
Figure 12:
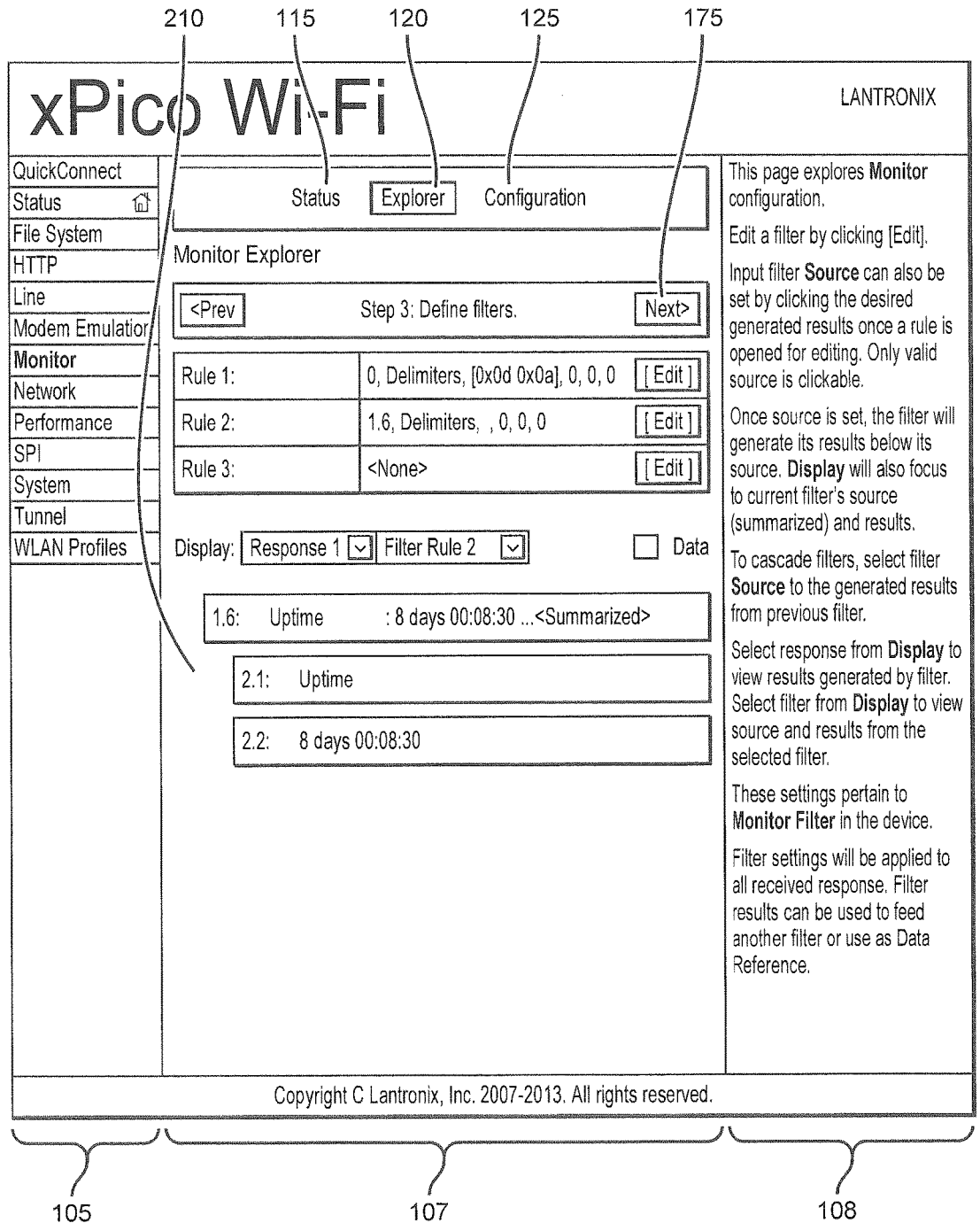
Figure 13:
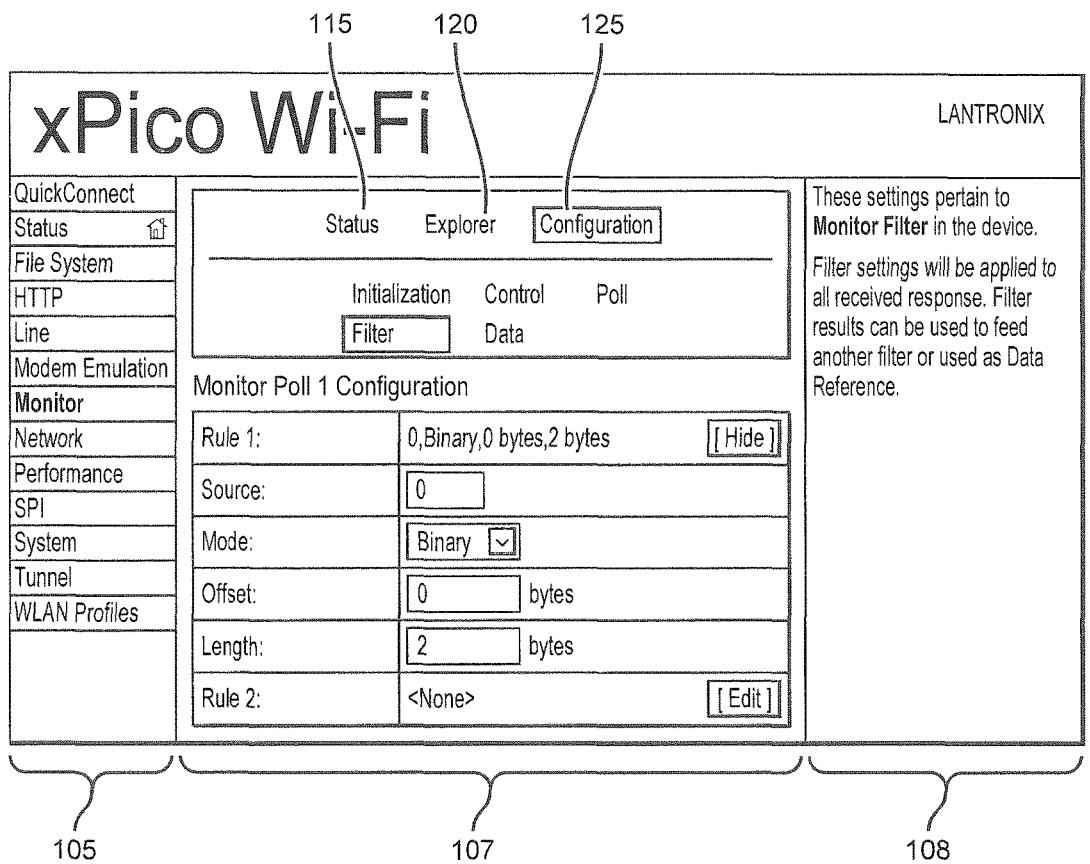
Figure 14:
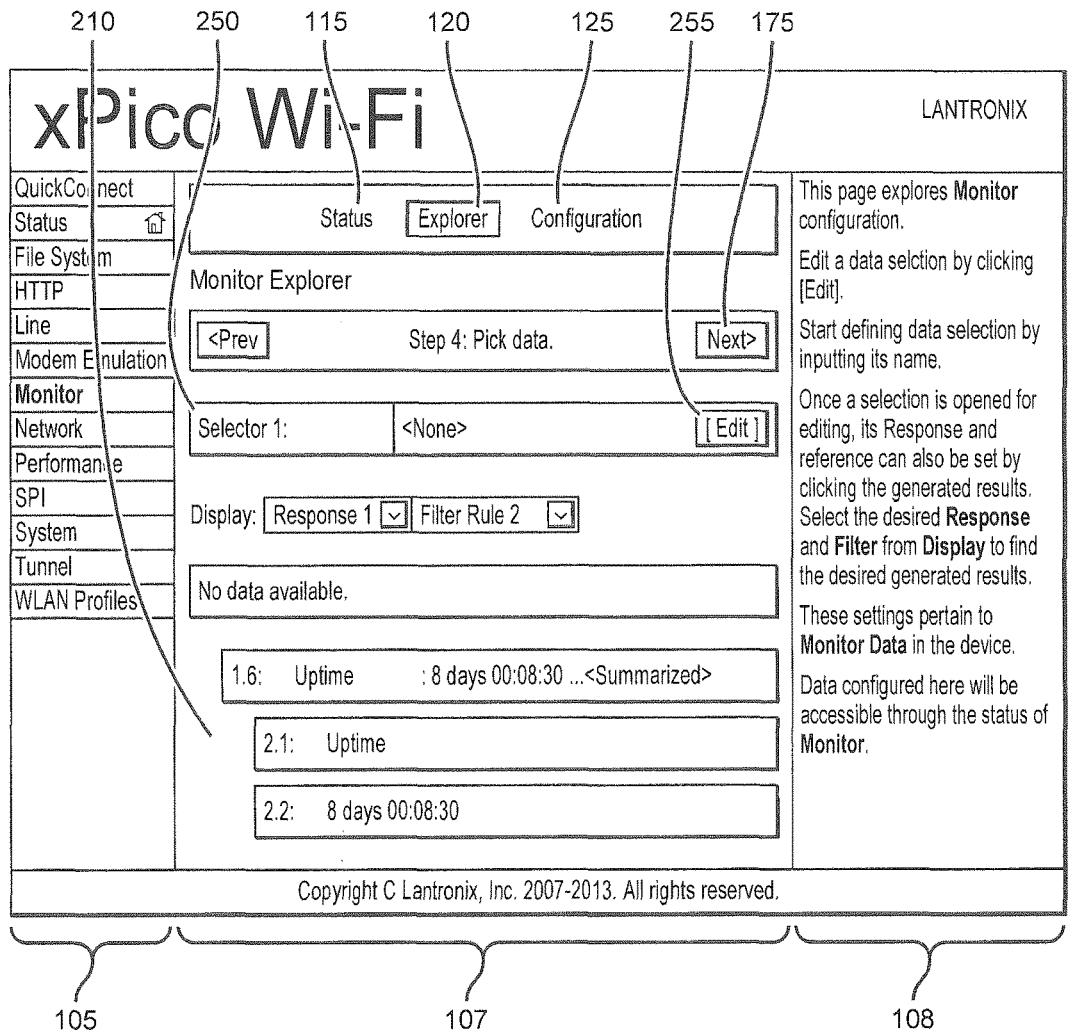
Figure 15:
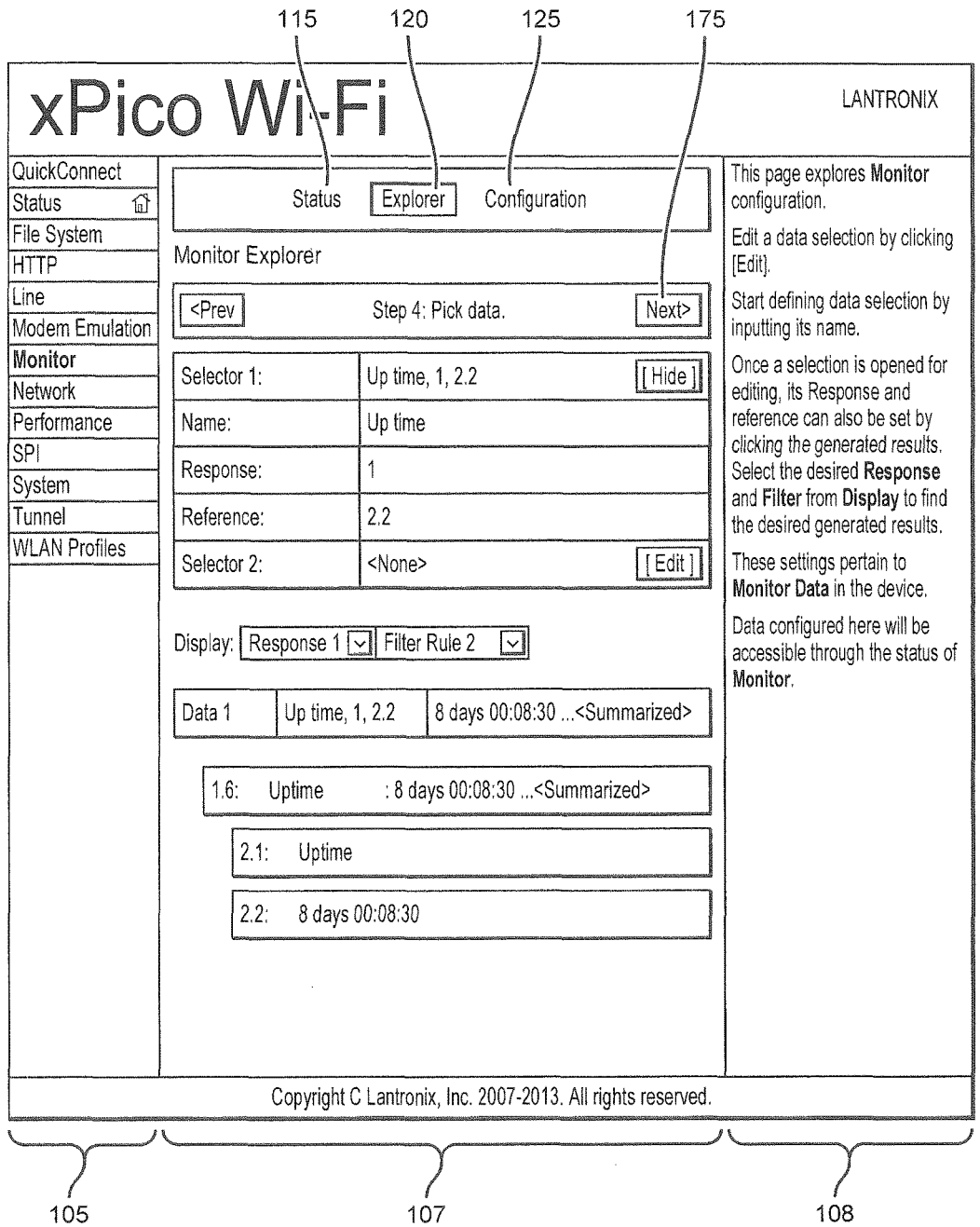
Figure 16:
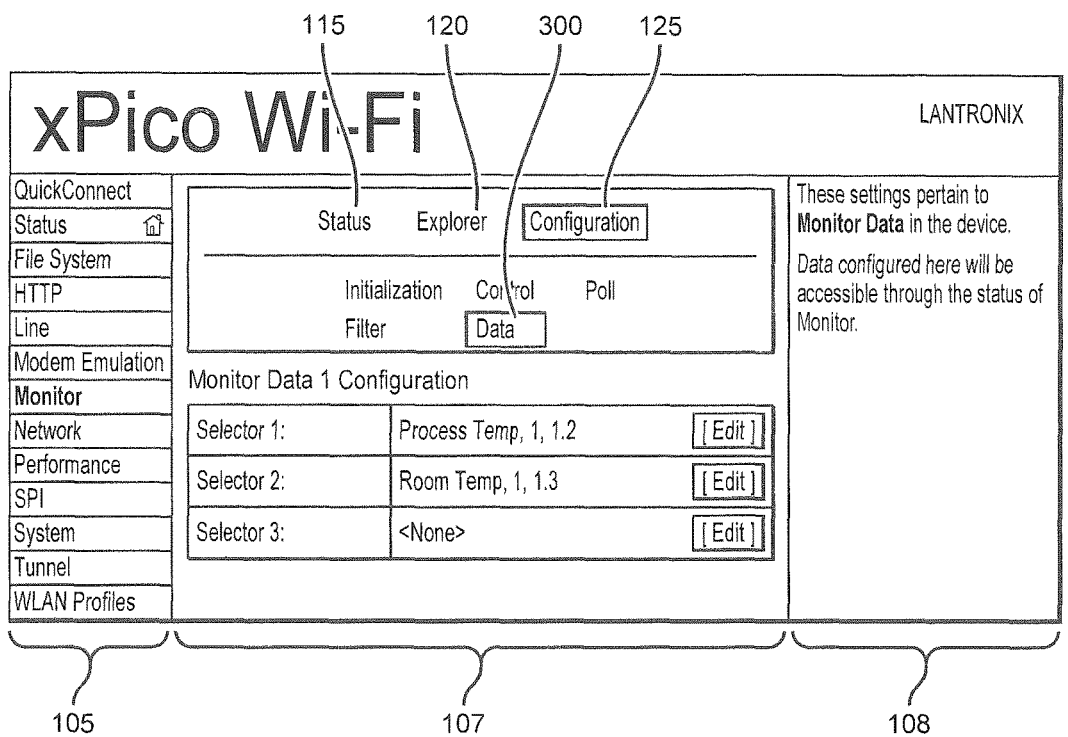
Figure 17:
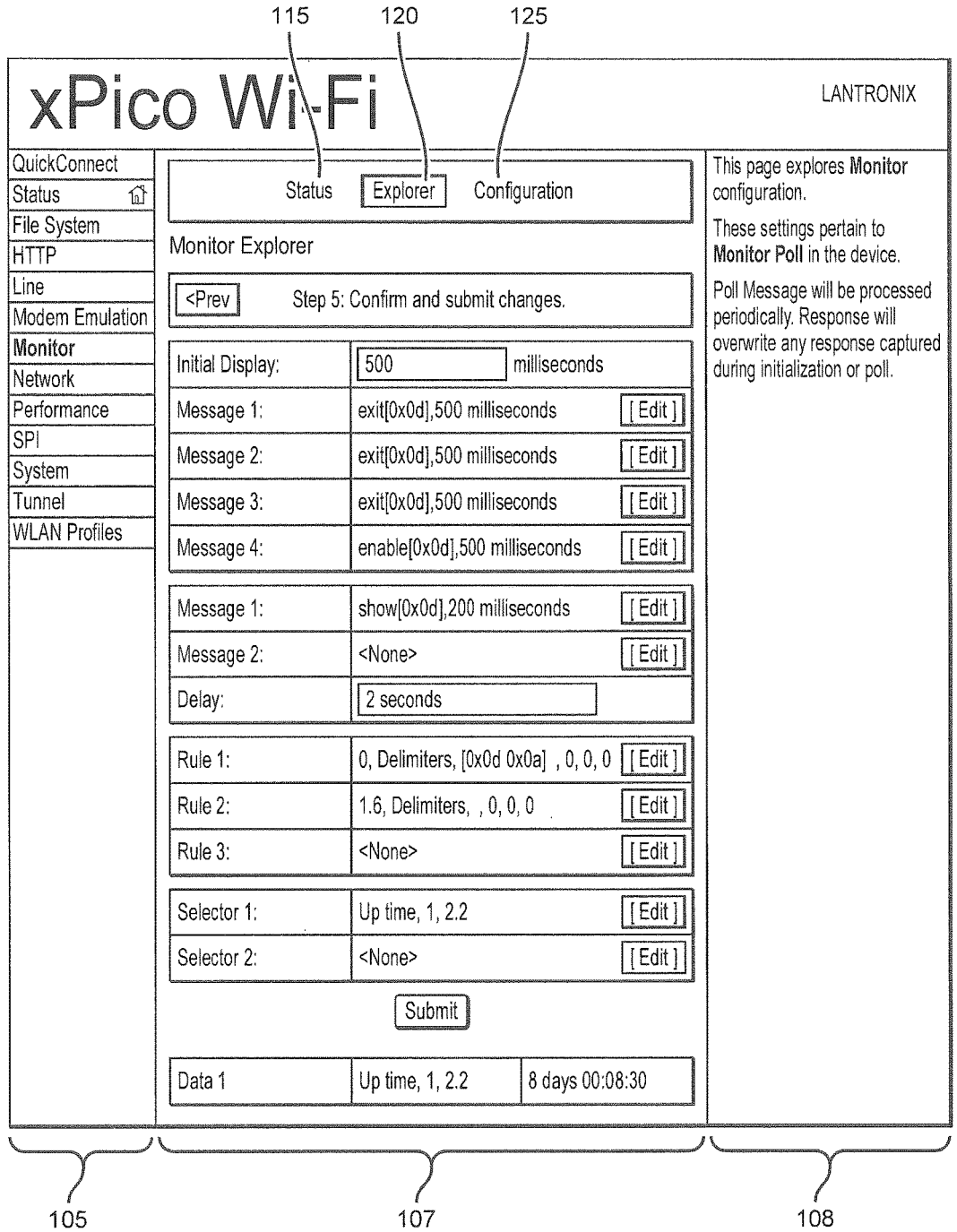
Figure 18:
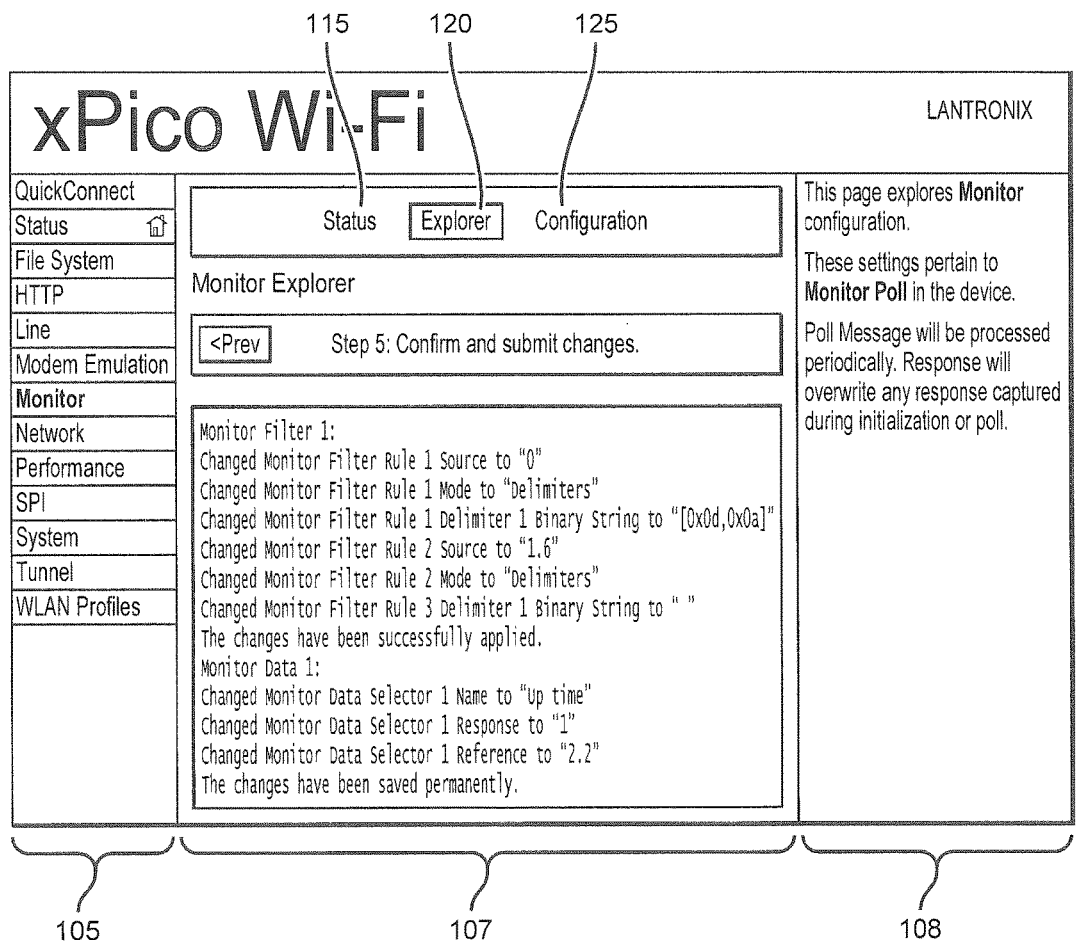
Figures 19, 20:
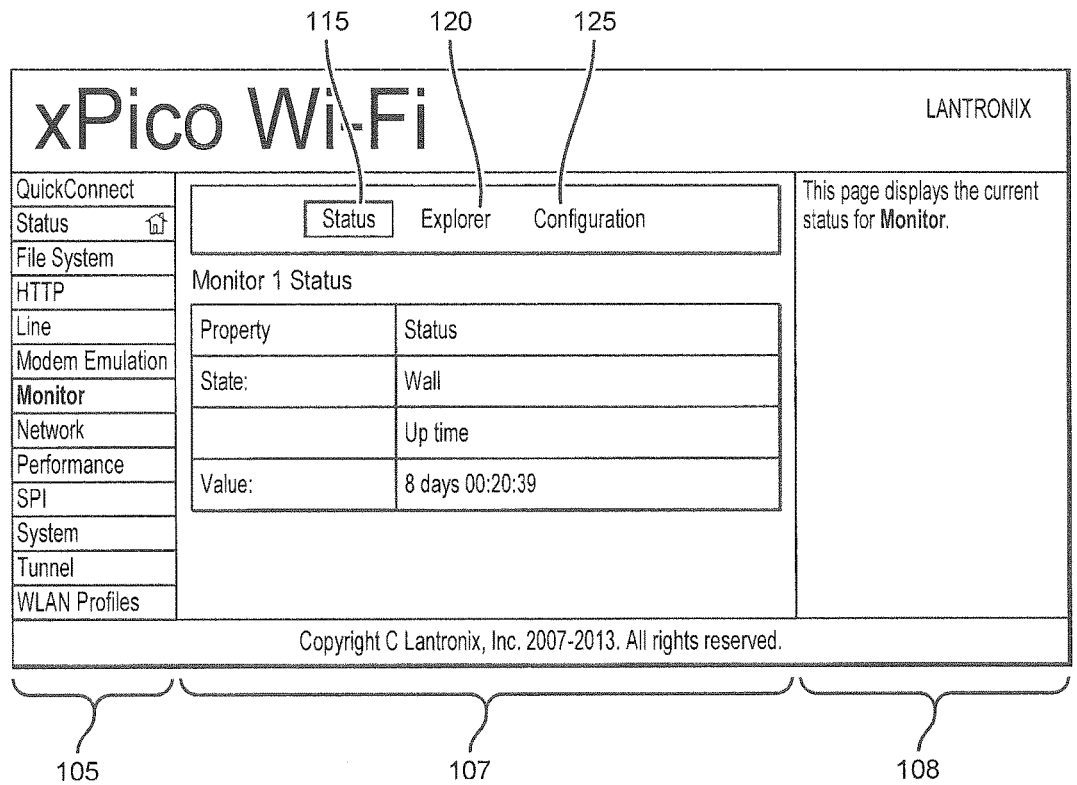
Figure 21:
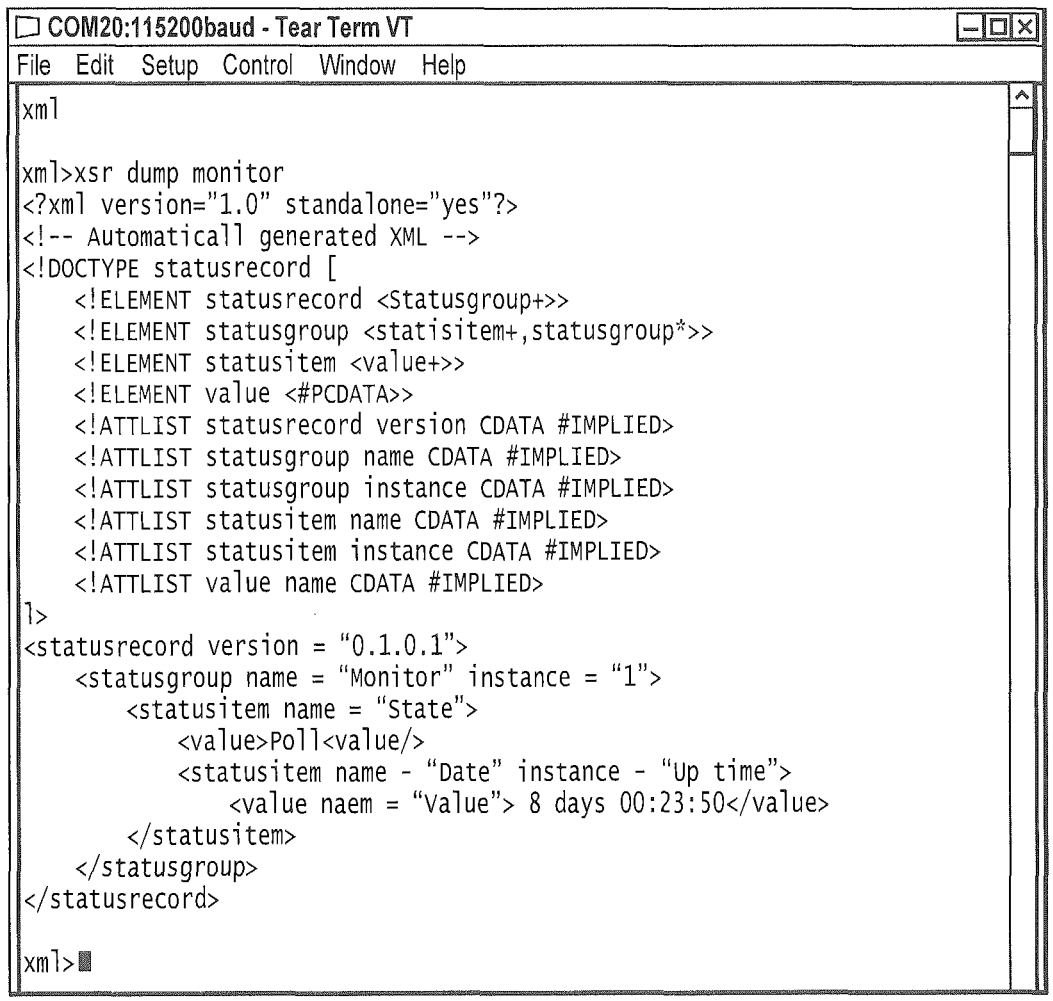
Figure 22:
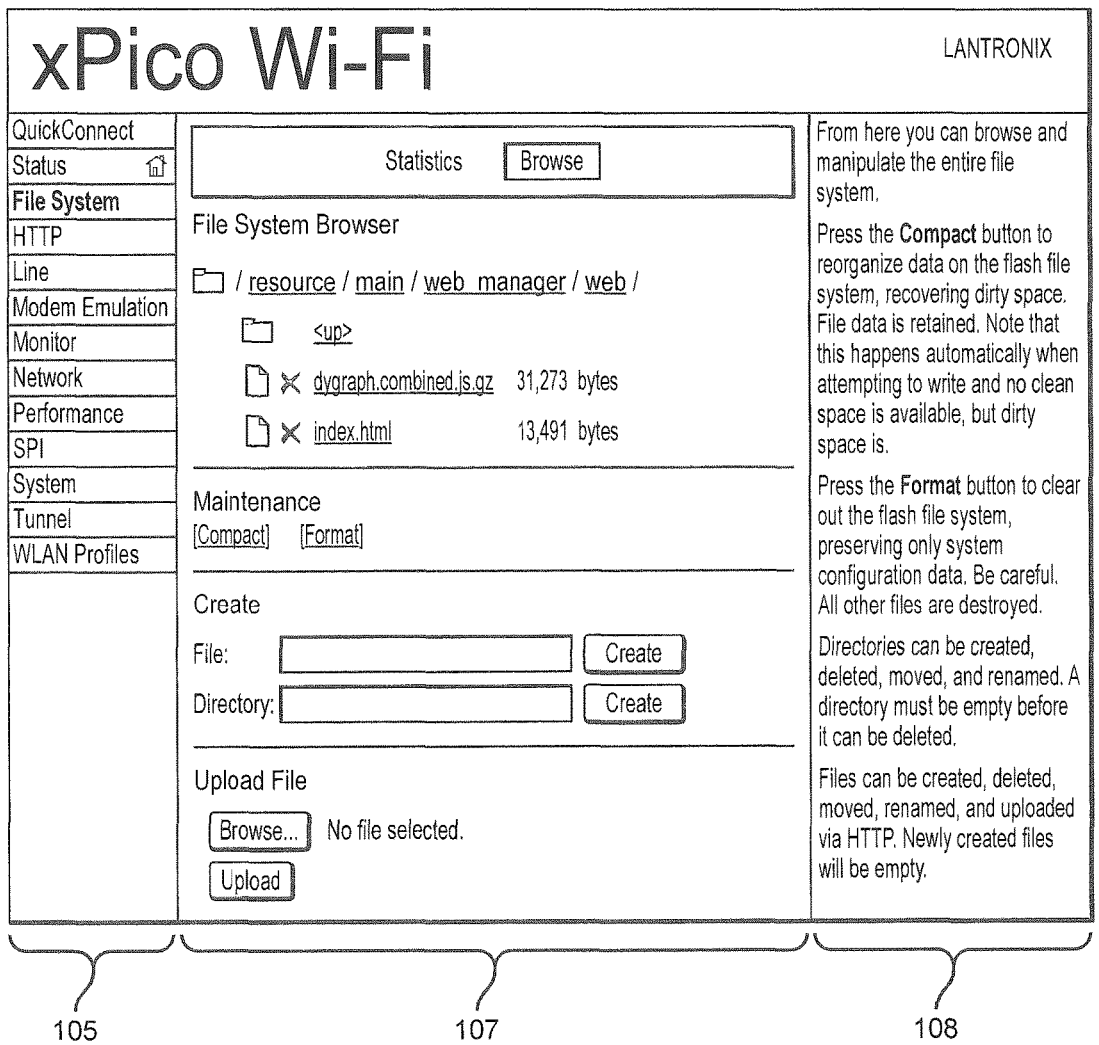
Figure 23:
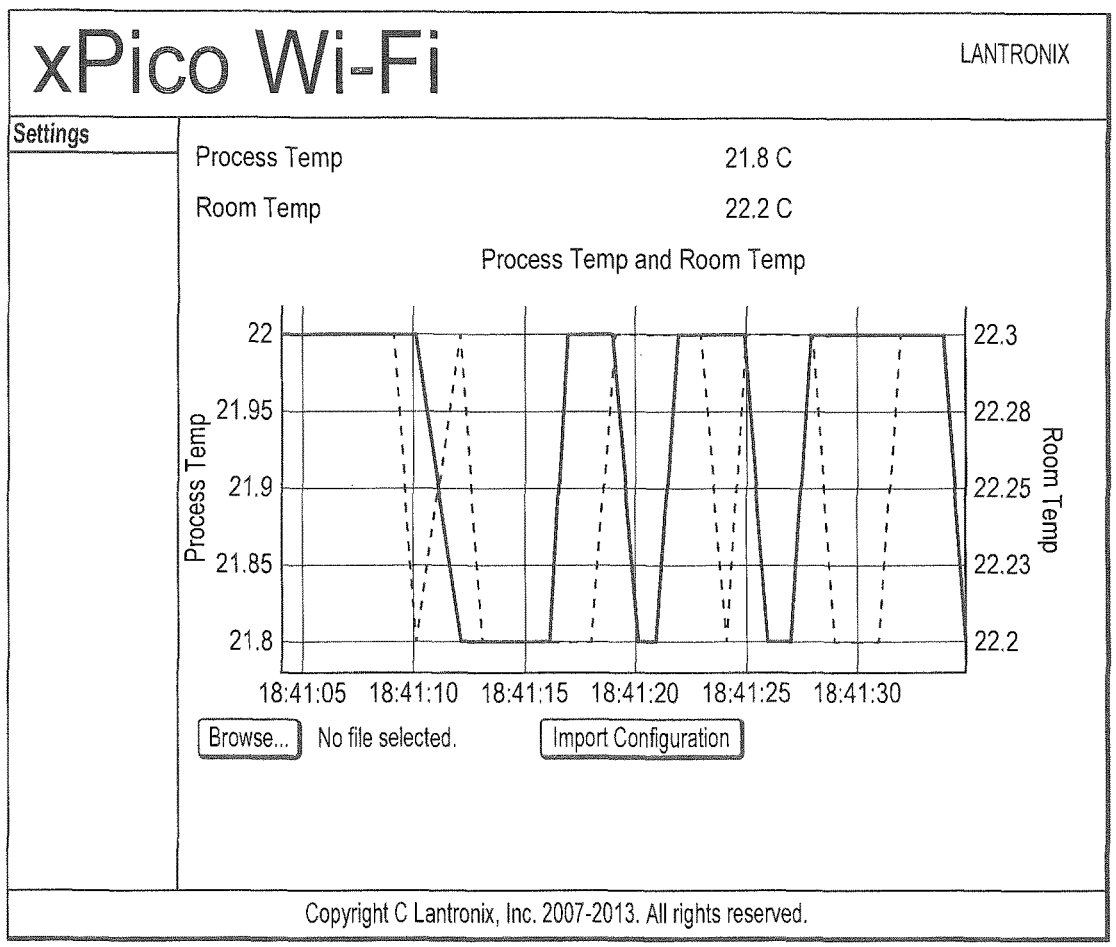

FIG. 11 illustrates an exemplary screen of the Monitor Explorer program that may be used to configure filters to be applied to data received by the device driver from the serial device when the serial device is polled by the device driver;

FIG. 12 illustrates an exemplary screen of the Monitor Explorer program displaying the result of rules that have been configured in the Explorer program to filter data received from the serial device by the device server;

FIG. 13 illustrates an exemplary screen of a Monitor Configuration program that may be used to directly configure the rules that are applied to data received from a serial device;

FIG. 14 illustrates an exemplary screen of the Monitor Explorer program used to configure parameters to establish selectors that are applied to the output of rules to specify data to be captured from the raw data received by the device server from the serial device;

FIG. 15 illustrates an exemplary screen of the Monitor Explorer program showing an expansion of the screen of FIG. 14 that allows configuration of individual parameters defining a selector;

FIG. 16 illustrates an exemplary screen of the Monitor Configuration program that is used to directly modify data selection parameters;

FIG. 17 illustrates an exemplary screen of the Monitor Explorer program showing the configuration of polling messages, rules and data selectors that will be applied to raw data received by the device driver from the serial device;

FIG. 18 illustrates an exemplary screen showing the results of submitting the configuration depicted in FIG. 17 to be stored in the memory of the device server;

FIG. 19 illustrates an exemplary screen showing the display generated by a Monitor Status feature;

FIG. 20 illustrates using a command line interface to display data mined from the raw data received from the serial device by the device server using the configuration depicted in FIG. 17;

FIG. 21 illustrates using XML programming to display data mined from the raw data received from the serial device by the device server using the configuration depicted in FIG. 17;

FIG. 22 illustrates a screen of a File System Browser feature of a Web Manager software to select a program and format to be used to display data produced by the various embodiments of the invention; and FIG. 23 illustrates an exemplary screen of the output of the of the selection of the program and format of FIG. 22.

Various embodiments may incorporate one or more of these and other features described herein while remaining within the spirit and scope of the invention. Further features of the present invention, its nature, and various advantages and embodiments will be more apparent by reference to the accompanying drawings and the following detailed description of the exemplary embodiments of the present invention.

DETAILED DESCRIPTION OF EMBODIMENTS

In the following description, numerous specific details are set forth, such as examples of specific data signals, named components, connections, number of memory columns in a group of memory columns, and the like, in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, a system and method are provided which enables a user to connect a serial port of a device server to a serial port of a serial device, query and capture data and settings pertaining to the serial device such that the device server can communicate and exchange data with the serial device without requiring customized programming. The device server may periodically query and capture user-specified data from the serial device. A poll configuration feature may be used to specify one or more commands which the device server will periodically query from the serial device. The response to each poll may be further sliced into a multiplicity of fields according to user-specified filter rules. The captured data may be presented to other users online by way of a Web Manager, and the device server may establish machine-to-machine communications by way of XML and a Command Line Interface.

Figure 1:
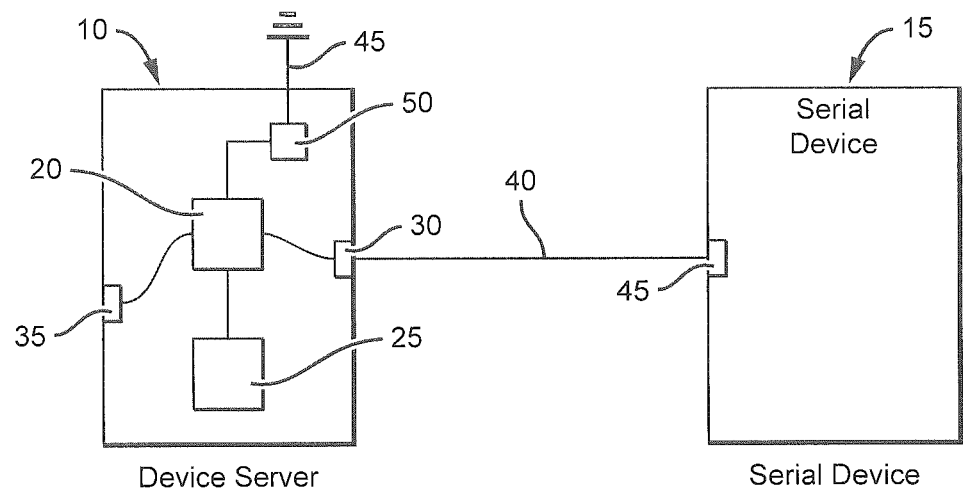
FIG. 1 is a schematic diagram illustrating the connection of a serial device to a device server.

FIG. 1 illustrates an exemplary embodiment depicting the connection of a device server 10 to a serial device 15. The device server includes, but is not limited to, a processor 20 and a memory 25 which is in operable communication with the processor 20. The device server 10 also includes a serial port 30 and an Ethernet port 35. The device server also includes a communication interface (not shown), which couples the processor to the serial port 30 and Ethernet port 25.

The processor 20 is configured and controlled using programming consisting of various software commands which may be stored in memory 25. The processor operates in accordance with software commands to carry out the functions of a server to facilitate communications between the device server and the serial device 15. The programming may be written in any suitable programming language that is capable of being run by the processor, in compiled form in some instances, and in as written form in other instances, such as when providing network services based on hypertext markup language.

Throughout the description reference will be made to various software programs and hardware components that provide and carryout the features and functions of the various embodiments of the present invention. Software programs may be embedded onto a machine-readable medium. A machine-readable medium includes any mechanism that provides, stores or transmits information in a form readable by a machine, such as for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

Referring again to FIG. 1, device server 20 communicates with serial device 15 over serial connection 40, which may be a serial cable capable of carrying signals confirming to the RS232 standard between the device server and the serial device, Serial connection 40 connects serial port 30 of the device server to serial port 45 of the serial device.

Device server 20 also includes Ethernet port 35, which facilitates connection to a wired Ethernet based network. Alternatively, device server may also include a wireless transmitter/receiver 50 which is configured to be controlled by the processor 20 to send and receive information through antenna 45 through a wireless network.

FIG. 2 depicts one embodiment illustrating a network enabled control system 60 for communicating with a serial device 75. In this embodiment, device server 70 is coupled through network/cloud 65 to a user 80. Device server 70 is also coupled by communication line 85 to serial device 75 through the serial ports of both devices. As discussed above, device server 70 may be coupled wirelessly, or through a wired network, such as an Ethernet network, or the Internet to user 80. User 80 will typically be a computer having a processor, input/output device such as a keyboard, mouse or other input means, and a display, memory and communication interface.

It will be understood by those skilled in the art that the network/cloud may comprise one or more servers, databases, and associated memory or other storage facilities, as well as appropriate communication circuitry and interfaces to facilitate information flow between the user and device server. Various software programs may also be run on the User's processor, the device server, and any or all of the servers comprising the network to allow for bidirectional communication of information through the network.

For example, device server 70 may include software that provides a graphic user interface (GUI), or a command line architecture, that can be accessed by a user to communicate with, configure, and control the processor of the server. One such program may be program such as a Monitor Explorer, one screen of which is illustrated in FIG. 3. Using such a program as Monitor Explorer to provide a GUI allows for configuration and use of the device server 70 by a user to capture data from serial device 75 without requiring specialized programming. Moreover, since the device server 70 is network enabled, the user may configure, operate, and capture data from serial device 75 remotely, that is, from a location that is remote from either device server 70, serial device 75, or both.

Monitor Explorer is an embodiment of a software program that is stored in the memory 25 of device server 10 (FIG. 1). Alternatively, the Monitor Explorer program may be firmware embedded in the processor. In either case the Monitor Explorer program provides an interface between the device server and the user so that the user can explore the communication requirements and settings of the serial device through the device server, and then configure the device server to transmit and receive information and data from the serial device which can then be transmitted through the network to the user, or to some other entity that wishes to receive the information and/or data from the serial device.

The Monitor Explorer program may also be accessed through a program such as a web manager program that is stored in the memory of the device server. A user, upon connecting to the device server, may log into the web manager, and, upon validation of the user's right to access the device server, may be presented with various programs or sub-programs that may be called using in the web manager.

Typically, device server 70 will not be directly coupled to a display or user input/output devices. Accordingly, the processor of device server 70 is accessed by a user indirectly, through a network connection. Accordingly, the examples and description below may be assumed to contemplate that a person using the GUI described below has already logged into the device server.

When an external serial device is initially connected to the device server 70, the initial state of the external serial device is unknown to the device server. Accordingly, a screen such as that depicted in FIG. 3 is presented to the user, indicating that the status of the serial device is unknown.

FIG. 3 depicts one embodiment of a software program, hereinafter identified for exemplary purposes only as a web manager 100, that provides various functions for monitoring and controlling a device controller to which is connected a serial device. Web manager 100 includes a column 105 in which are displayed various tabs, each tab associated with a particular function of the web manager program. For example, column 105 includes a "monitor" tab 110.

As shown in FIG. 3, the display also includes a central portion 107, which includes various soft keys or buttons (tabs or hot spots that can be activated using a touch screen, or which can be accessed using traditional pointing techniques, such as arrow keys or a mouse) such as a "Status" button 115, an "Explore" button 120, and a "Configuration" button 125. As will be discussed in greater detail below, activating one of the buttons results in a sub-program call that displays various screens associated with the particular button activated. These displays are configured to display information, allow for input of commands and parameter values, or both. Other soft keys or buttons may be incorporated into various areas of the central portion 107 to facilitate selection of a particular function or feature of the software program.

The central portion 107 also includes areas that are designated for the display of information or data that is communicated to the user. Under certain circumstances, the program may display information to the user, and also provide an area for the user to enter a command or response. Column 108 typically provides information to the user to assist the user in interpreting and/or responding to data, information, or command requests presented by the program in central portion 107.

Upon connecting the serial device to the device server, a user may select Monitor from the tabs of column 105 to determine the status of the serial device. At this time, the user may select the "Explore" button 120 to "explore" the serial device to determine the serial device's initial state.

Alternatively, the user may access an alternative embodiment, shown in FIG. 4, by selecting "SPI" tab 150 from column 105. Activating this tab displays the screen shown in FIG. 4 using a Serial Peripheral Interface (SPI) bus when the device driver is connected to an external slave device. The initial state of the slave device is displayed in an SPI Configuration screen. Entries made using this screen take effect immediately.

In one embodiment, the "Explore" feature of the Monitor program provides a sequence of five display pages to the user that may be used to determine the proper settings to communicate with the serial device as well as make entries to configure the device server to communicate with the serial device. The "Configuration" button 125 may also be activated from any of the displayed pages to go directly to an applicable configuration page and make specific changes. The device monitoring status may also be viewed by activating the "Status" button 115.

The screens that are displayed to the user may be used to determine the output provided by the serial device and also to allow the user to create data parsing rules for selecting specific data from the stream of data produced by the serial device. All of this may be accomplished in real time without the need for the user to write complicated programming, and the results of the user entries may be tested in real time to determine if the entered rules and other parameters provide the desired data. Once the rules and parameters are entered, they may be stored in the memory of the device driver, and then are used by the processor of the device driver to interpret and parse the incoming stream of data from the serial device to provide data desired by the user to be transmitted through the Ethernet port of the device server to the user over a network or the Internet.

In one embodiment, the five pages presented to the user when accessing the "Explorer" program include: a setup initiation page; a setup commands page; a define filters page; a pick data page; and a confirm and submit changes page.

FIG. 5 illustrates one embodiment of a screen presenting the setup initialization page screen f the Monitor Explorer program. As shown, the setup initialization page may be used to send one or more messages to the serial device so as to bring the serial device into a known state. For example, a Message 160 may be created that is sent to the serial device to determine the device's status. Message 160, in this embodiment, comprises four fields which are accessed by activating the "Edit" button or soft key 165 for that message. The fields of the string that comprises Message 1 (and all the messages shown in FIG. 5), are, in order: command, entered in binary format, such as for example [0x0d] for a carriage return or enter key command; end character; length of the response; and timeout, which is the minimum time the device server will wait for a response. Once these parameters are entered by the user, the user activates the "Submit" button or soft key 170.

FIG. 6 illustrates the response from the serial device when the submit button 170 is activated. As shown, four messages submitted resulted in responses from the serial device that are shown in area 180.

Once the initial setup is completed, the "Next" button 175 is activated which changes the display screen to the setup commands page shown in FIG. 7. Using this page, the user can modify each of the messages transmitted by the device server to the serial device. Further, the data displayed for each Message pertain to the poll settings for the device. A poll refers to how often the device server will send a message to the serial device.

For example, to modify Message 1, the user activates "Edit" button 190, which expands the screen display as depicted in FIG. 8 to show the values for each of the fields that comprise the string of Message 1. This page provides the user with entry fields for each of the fields comprising the string of parameters which makes up Message 1. The expanded display can be compressed by activating the "hide" button 200.

As shown, the values for the command, end character, length and timeout fields can be modified. As described above, each time the device server transmits (or polls) the message to the serial device, the command identified in the command field sent to the device should evoke a response from the serial device. The character end field identifies a character that the device server looks for that identifies the end of a response from the serial device to the transmitted command. The length field sets the maximum length of the response, and the timeout field sets the length of time the device server will wait for a response from the serial device. Each of the configuration parameters may be modified on this page.

Alternatively, the user may activates the Monitor "Configuration" button 125 to directly modify one or more poll settings. This alters the display to that illustrated in FIG. 9. Use of this page allows the user to change the settings of each message so as to optimize communication with the serial device until acceptable initiation settings are determined.

In an embodiment, illustrated in FIG. 10, the Monitor Explorer program may be used to test the commands selected in the Monitor Poll Configuration feature, enabling the user to view an immediate response from the serial device. For example, as shown in area 180, Message 1 was altered from exit[0x0d], with a timeout of 500 milliseconds to show[0x0d], with a timeout of 200 milliseconds. The Display field 130 was altered to display the result of Message 1, the results of which are shown directly below in area 135.

In an exemplary embodiment, the response to each poll may be sliced into smaller portions according to user-specified filter rules. Slicing the data advantageously facilitates later access to the desired data, without having to search through large quantities of unneeded data. In one embodiment, the user may examine the form of the response received from a particular poll, looking for clues in the response to locate desired information. The user may further determine whether the form of the response may include variations depending on the state of the serial device.

The rules for slicing the poll responses are configured by accessing the Define filter page, as illustrated in FIG. 11. In this embodiment, the user may utilize Monitor Explorer, or may directly configure the rule settings in a Monitor Filter Configuration feature. The response from the poll is shown in area 195. The user typically analyzes this response to determine what data the user is interested in.

For example, the user may be interested in the value for the "Uptime" parameter, identified by reference numeral 205. As shown in FIG. 11 using the Monitor Explorer program, Rule 1 has no definition parameters. Rule 1 can be modified from this screen by activating the "Edit" button 200 to focus in on the "Uptime" parameter.

As will be apparent, many different rules may be established to parse the data and information provided by the serial device to the poll of the device server. Rules are generally performed sequentially, but each rule can point to either raw source (0) or a result of a previous rule (R.f). In one embodiment, each rule may slice the raw input from the serial device into multiple fields (f). Thus, the nomenclature R.f refers to a particular sliced result selected from the rule.

FIG. 12 illustrates setting up an exemplary series of rules to identify and slice the response contained in area 195 of FIG. 11 into usable information. In this example, Rule 1is comprised of a series of parameters that are used to point to the first carriage return indicating the beginning of a field of data as transmitted by the serial device. A rule is configured sung as many as six parameters, but may also be configured using less than six parameters, depending on the mode configuration selected.

The first of the six rule configuration parameters is source, which indicates the input of the filter or rule. In the example shown in FIG. 12, Rule 1 has a source of 0, which indicates that the input of Rule 1 is the raw response received by the device server from the serial device when it was polled. Rule 2, in contrast, has a source parameter of 1.6, indicating that, in R.f notation, it filters for information contained in the sixth field of the output of Rule 1.

The second rule configuration parameter sets the mode of the rule. In one embodiment, the possible values include: all, delimiters, or binary.

The third mode configuration parameter defines one or more delimiters that are applied with the rule, but is only displayed if delimiter mode is selected when entering the mode parameter, as described above, The number of delimiters to be applied is identified, as well as a binary string that is used to separate each delimited portion of the response. Delimiters are not included in a trunk of data. As shown in the display of the parameters for Rule 1, delimiter mode is selected, and the binary string separating information trunks is [0x0d, 0x0a].

The fourth rule configuration parameter identifies a start index to indicate when delimiters start breaking input into trunks, if delimiter mode is selected.

The fifth rule configuration parameter, is an offset parameter, which is used to set the size of the first trunk of data if binary mode is selected.

A sixth rule configuration parameter is a length parameter, which, when the binary mode is selected, specifies the size of a second trunk of data created by the binary filter, if the binary mode is selected. In this mode, a third trunk of data created by the binary filter will contain the remainder of the raw input.

Using the parameters defined above, Rules 1 and 2 are applied to the raw input displayed in area 195 of FIG. 11 are displayed in the response area 210 of FIG. 12. In this example, as indicated above, Rules 1 and 2 are configured to find the value for "Uptime" that is contained in the output of the serial device. Applying the rules to the output of the serial device yields a value for "Uptime" as 8 days 00:08.30. As shown, the display has been set to display the response as filtered by Rule 2.

FIG. 13 illustrates an exemplary alternative embodiment whereby the Configuration feature of the Monitor Explorer is utilized to set the filter parameters for various rules that will be applied to the data stream received from the serial device. This example illustrates how the filters can be defined using the binary mode, using user selected offset and length parameters.

Once the user has created one or more filters, the user may select the particular data to be mined, so as to present the data to other users or to one or more machines on the network. In an exemplary embodiment, the user may have created multiple polls and filters, and different filters may generally apply to each of the multiple polls, though some filters may be applicable to more than one poll. However, since all of the slicing of the raw data is virtual, and thus all of the filter rules overlay raw data from each response to a poll, the user need only be concerned with the rules pertaining to a particular poll message.

Once the rules and polling frequency for analyzing the data stream received from the serial device have been established, the user may then configure the device driver using the Monitor Explorer program to select specific data from the data stream to be displayed or transmitted to the user. In an exemplary embodiment, illustrated in FIGS. 14-15, the user may utilize Monitor Explorer or directly configure settings in a Monitor Data Configuration feature, as depicted in FIG. 16, to specify the data from the output of the Rules that have been applied that is desired for further display or analysis.

In Monitor Explorer, clicking the "Next" button on the "Define filters" page takes the user to the "Pick data" page, shown in FIG. 14. When the pick data page is displayed, two fields are displayed in area 250 identifying one or more "Selectors" that are used to identify the data that will be selected to be transmitted to the user or another piece of equipment that will use the data, or report the data. The first field identifies the particular selector, and the second field identifies the parameters of the Selector.

Multiple Selectors can be defined to select multiple data items from the results of the applications of the one or more rules previously defined and applied to the raw data received from the serial device by the device server. Activating the "Edit" button 255 associated with a particular Selector causes the display of the screen depicted in the FIG. 15, which provides for modifying the parameters of each Selector.

In an embodiment, illustrated in FIG. 15, each Selector has a Selector Name, a Response, and a Reference. The Selector Name is presented as a caption for the data associated with the Selector. The Response is a poll message number. The Reference is a rule number, dot, and a field number (R.f), which specifies the data field associated with the Selector.

Alternatively, the one or more Selectors (if any) may be configured using the "Configuration" program that is accessed by activating the "Configuration" button 125, as depicted in FIG. 16, When the "Data" button 300 is then activated, the data configuration screen is shown, which is similar in function to that described with reference to FIG. 15.

Once the user has configured the desired Selectors, the user may select the Confirm and submit changes screen of the Monitor Explorer as illustrated in FIG. 17 to review the parameters for the messages, rules and selectors set by the user to mine data from the raw input received by the device server from the serial device. As shown, each parameter may be further altered by activating the appropriate "Edit" button. When the user is satisfied with the configuration, the user may activate the "Submit" button to permanently change the configuration stored in the memory of the device server, the results of which are presented to the user as depicted in FIG. 18.

In an exemplary embodiment, the user may consider options for sharing the data that was mined utilizing the various embodiments described above. In an embodiment, a Web page may be used for presenting the data to other users. In another embodiment, XML may be used to present the data for machine-to-machine communications. In still another embodiment, a Command Line Interface may be used for both machine-to-machine communications and other users.

In an embodiment illustrated in FIG. 19, the mined data is automatically presented upon utilizing the Monitor Status feature in the Web Manager. In another embodiment, illustrated in FIG. 20, the data may be automatically displayed by way of a Command Line Interface. In still another embodiment, illustrated in FIG. 21, the mined data may be automatically displayed using XML programming code.

In an exemplary embodiment, data received from a serial device may be presented to a user through the Web Manager software running on the processor of the device server. Typically, however, the data that results from application of the various Messages, Rules and Selectors of the various embodiments described above needs to be formatted in a manner that allows the data to be presented or transmitted in a useful manner.

For example, in the case where a Serial Peripheral Interface port of the device server is connected to an external SPI slave device, the data may be communicated to the device server in a binary format, which is processed as described above. The binary form of data from the SPI must be converted to an appropriate format before being presented. In an embodiment, the binary data may be converted by using HTML and/or JavaScript programs that are loaded into and run by the processor of the device server.

FIG. 22 illustrates one embodiment of a compressed JavaScript chart library (i.e., dygraph.combined.js.gz) and a customized device home page (i.e., index.html) that may be selected and run by a user of a File System Browser feature of the Web Manager to display desired data that has been extracted from the raw data stream received by the device server from the serial device using the various embodiment described above. FIG. 23 illustrates one embodiment of the customized JavaScript chart library presented on the customized device home page, illustrating process and room temperature as a fimction of time, as measured by one or more serial temperature sensing devices that are monitored by a device server using the systems and methods of the various embodiments of the present invention described above. Those skilled in the art will appreciate that other software programs or languages may be used to convert the processed data from the device server into a useable form without departing from the contemplated scope of the invention.

While the user interface of the present invention has be described with reference to a graphical user interface, as shown in the drawings, the device server configuration settings may be explored and/or altered using alternative interface designs and methods. For example, a text based interface, such as, but not limited to, a command line interface, may be used. In one embodiment, a user enters a parameter name followed by a parameter value on a command line displayed to the user.

In another alternative embodiment, an XML interface may be used. In one embodiment, the user supplies parameter names and desired values using an XML interface which provides the device server with the parameter names and values in a machine readable format.

Various embodiments may incorporate one or more of these and other features described herein while remaining within the spirit and scope of the invention. Further features of the present invention, its nature, and various advantages and embodiments will be apparent to those of ordinary skill in the art by reference to the accompanying drawings and the above summary of the preferred embodiments of the present invention.

I claim:

1. A method of configuring a device server to communicate with and capture data from a serial device coupled to the device server, comprising:
    providing a user interface for to explore communication requirements and a setting of the serial device and for configuring a device server to communicate with the serial device and to interpret information received from the serial device;
    inputting polling parameters using the user interface to formulate a polling message to be transmitted from the device server to the serial device;
    transmitting the polling message from the device server to the serial device;
    receiving a response to the polling message transmitted by the device server to the serial device from the serial device;
    defining at least one filter and applying the at least one filter to parse the response from the serial device; and
    defining at least one data selector and applying the at least one data selector to the parsed response from the serial device to select data to be transmitted to a user.

2. The method of claim 1, wherein formulating a polling message includes defining a listening interval during which a response to the polling message is expected.

3. The method of claim 1, wherein defining the at least one filter includes defining an input and an output for the at least one filter.

4. The method of claim 1, further comprising defining a plurality of filters, each of the plurality of filters having an input and an output.

5. The method of claim 4, wherein the output of at least one of the plurality of filters feeds the input of another one of the plurality of filters.

6. The method of claim 1, further comprising displaying the selected data to the user.

7. The method of claim 1, wherein the user interface is provided by the device server to the user over a network.

8. The method of claim 7, further comprising displaying the selected data to the user over a network.

9. The method of claim 7, wherein the user interface provides for selecting a software program for use in displaying the selected data.

10. The method of claim 1, wherein the user interface is a graphical user interface.

11. The method of claim 1, wherein the user interface is a command line interface.

12. The method of claim 1, wherein the user interface is an XML interface.

* * * * *